Figure 1:
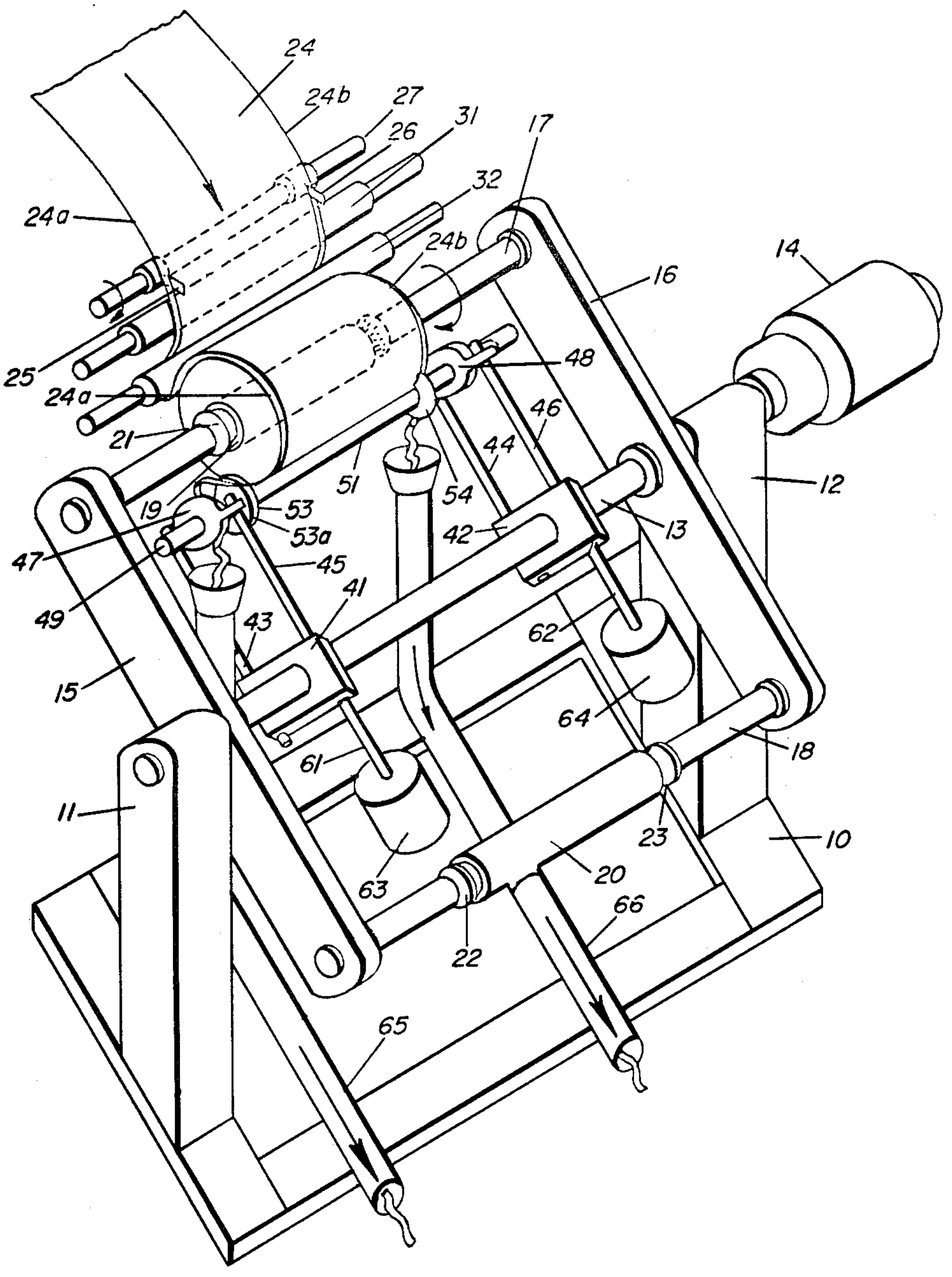

METHOD FOR FORMING MILL ROLLS OF SHEETED MATERIALS

Original Filed March 21, 1962 5 Sheets-Sheet 1

INVENTOR
HERBERT O. CORBETT
BY Allen A. Meyer Jr.

INVENTOR.
HERBERT O. CORBETT
BY
[signature]

Dec. 28, 1965 H. O. CORBETT 3,226,049
METHOD FOR FORMING MILL ROLLS OF SHEETED MATERIALS
Original Filed March 21, 1962 5 Sheets-Sheet 2

*INVENTOR.*
BY

INVENTOR.
HERBERT O. CORBETT
BY

Dec. 28, 1965        H. O. CORBETT        3,226,049
METHOD FOR FORMING MILL ROLLS OF SHEETED MATERIALS
Original Filed March 21, 1962        5 Sheets-Sheet 3

INVENTOR.

INVENTOR.
HERBERT O. CORBETT
BY

Dec. 28, 1965   H. O. CORBETT   3,226,049
METHOD FOR FORMING MILL ROLLS OF SHEETED MATERIALS
Original Filed March 21, 1962   5 Sheets-Sheet 4

INVENTOR.
BY

Dec. 28, 1965 H. O. CORBETT 3,226,049

METHOD FOR FORMING MILL ROLLS OF SHEETED MATERIALS

Original Filed March 21, 1962 5 Sheets-Sheet 5

INVENTOR.
HERBERT O. CORBETT
BY
Allen A. Meyer Jr.

3,226,049
Patented Dec. 28, 1965

3,226,049

METHOD FOR FORMING MILL ROLLS OF SHEETED MATERIALS

Herbert O. Corbett, Bridgeport, Conn., assignor to National Distillers and Chemical Corporation, New York, N.Y., a corporation of Virginia Original application Mar. 21, 1962, Ser. No. 181,245. Divided and this application Feb. 26, 1965, Ser. No. 435,620
3 Claims. (Cl. 242—56.3)

The present invention relates to an improved method and apparatus for forming mill rolls of sheet materials. This application is a divisional application of copending application Serial No. 181,245, filed March 21, 1962, entitled "Method and Apparatus for Forming Mill Rolls of Sheeted Materials." Further, the invention relates to an improved method of forming such rolls, wherein the sheet material is laid up under a tension applied laterally of the wound sheet in a manner adapted to smooth each layer of material as it is wound upon the roll. More particularly, the invention relates to a method and apparatus whereby the laterally tensioned sheet is trimmed as it is wound to provide and maintain a wound sheet of uniform width without substantial irregularity in the longitudinal edge portions of the sheet or in the end portions of the wound roll.

In the forming of mill rolls of sheet materials, it is customary to place the sheet under tension longitudinally thereof. Also, where the sheet material may have been produced by extrusion or casting, as are thermoplastic materials, or by other means as in the production of fibrous materials, such as paper, the longitudinal edges of the sheet may be of heavier or lighter gauge, or may be otherwise irregular. In such circumstances it is customary to trim the sheet edge portions to eliminate irregularities and to produce a sheet of uniform gauge and width. Customarily, the sheet, under tension, is trimmed just prior to being wound.

In the winding of such sheet materials, it has been found that difficulties are experienced as a result of small variations in the sheet tension from edge to edge. These variations tend to produce small wrinkles and, at times, even definite folds extending in a generally longitudinal direction of the sheet. The wrinkles or folds may interfere with the formation of uniform and parallel edge portions as the sheet is trimmed. They may also result in a mill roll, wherein not only are the end portions of irregular conformation, but also wherein the sheet material layers are distorted and fail to be laid up in a flat, smooth condition.

It is an object of the present invention to overcome the defects of conventional systems for winding sheet materials to form mill rolls thereof. It is a further object of the invention to provide a method and apparatus whereby to apply a lateral tensioning force to the sheet material as it is laid up or wound to form a mill roll, and thereby substantially avoid wrinkling thereof under the effect of slight variation of the longitudinal tensioning force applied during the winding operation. It is also an object of the present invention to provide a method and means whereby the tensioned sheet material may be trimmed evenly and uniformly to produce a mill roll wherein the sheet material is of a uniform lateral dimension, and the roll end portions are of a substantially flat, regular conformation.

The invention and its objects may be more fully understood from the following specification, when it is read with reference to the accompanying drawings, wherein:

FIGURE 1 is a perspective view of a preferred form of apparatus for accomplishing the invention, taken from a position to the left of the line of travel of the sheet material being wound, and looking in a direction generally opposite to such line of travel, at an angle of about 45° thereto; and FIGURES 2A, 2B, 2C and 2D are diagrammatic illustrations of the relationships of key parts of the apparatus according to FIGURE 1 during certain phases of the roll-forming procedure and as viewed from a position to the left of and at right angles to the line of travel of the sheet material.

Figure 2A:
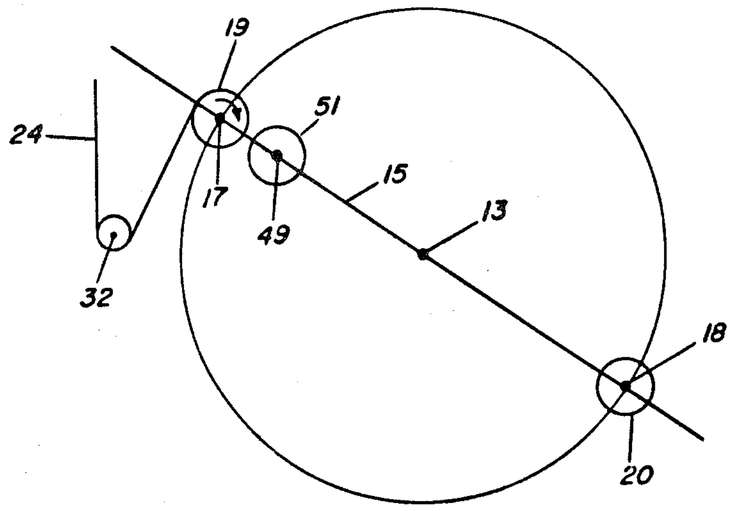
Figure 2B:
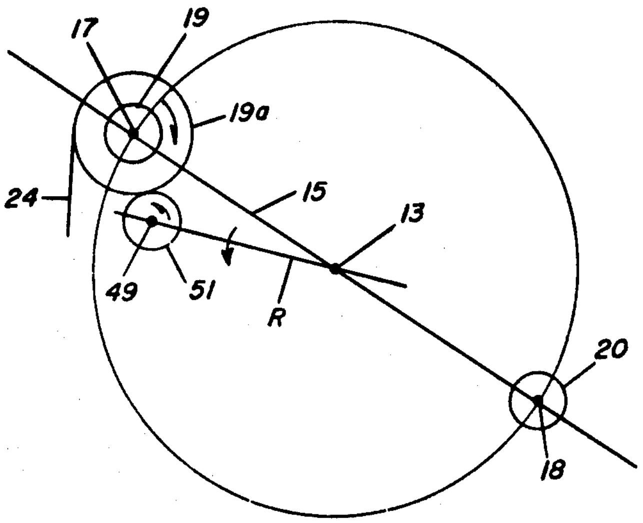
Figure 2C:
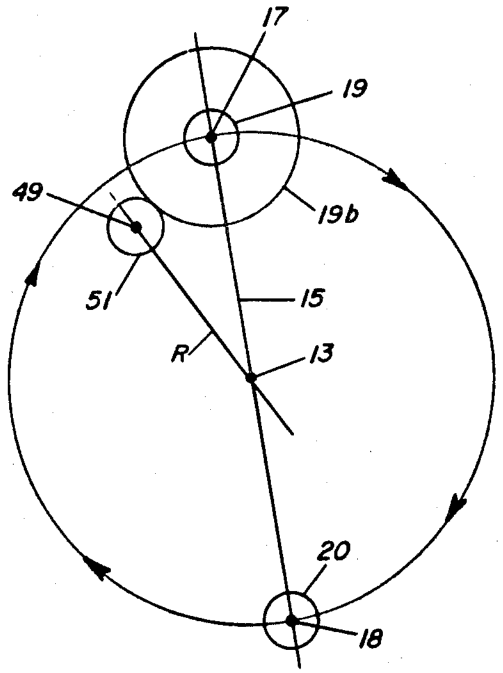
Figure 2D:
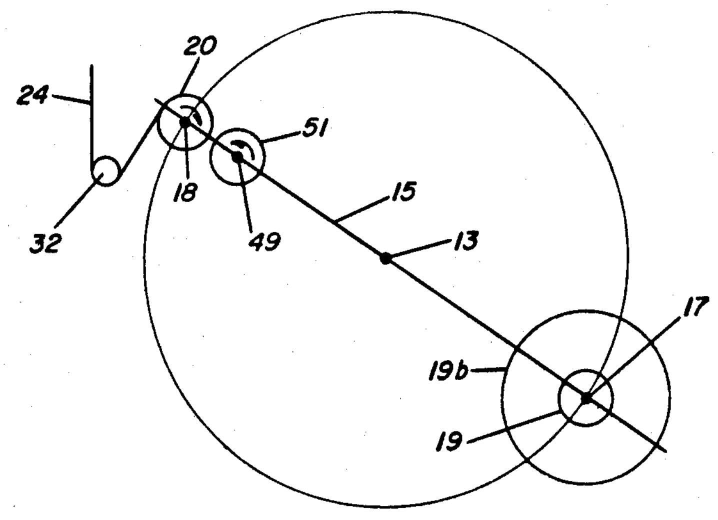
Figure 3A:
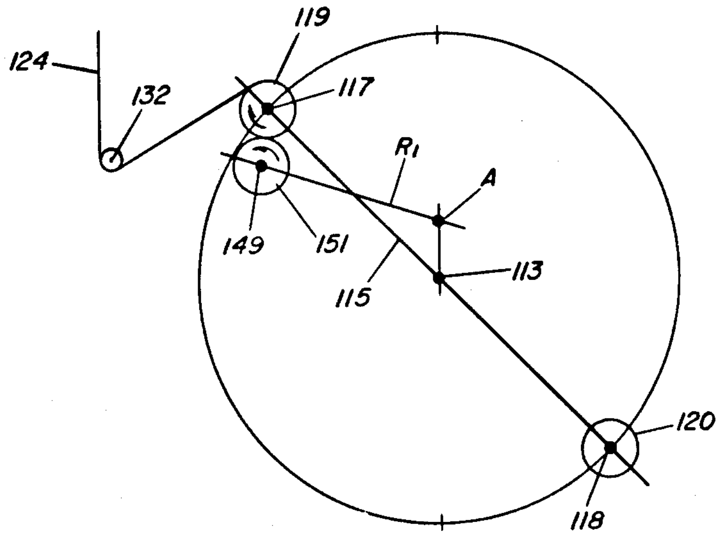
Figure 3B:
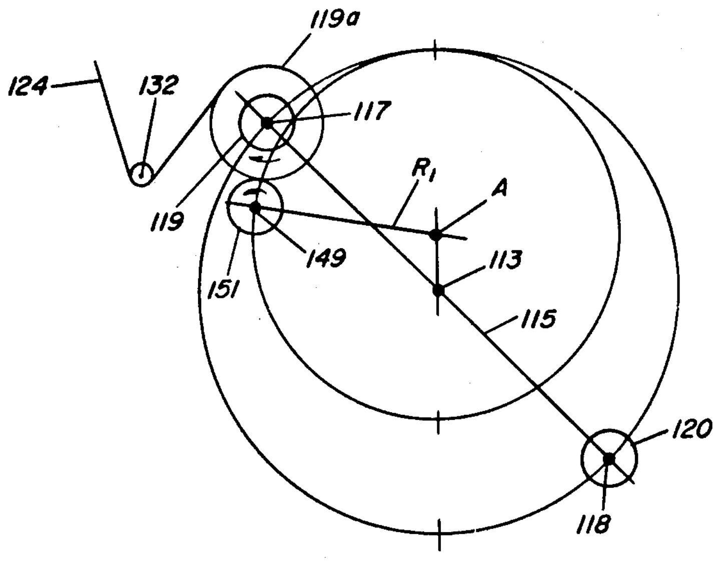
Figure 3C:
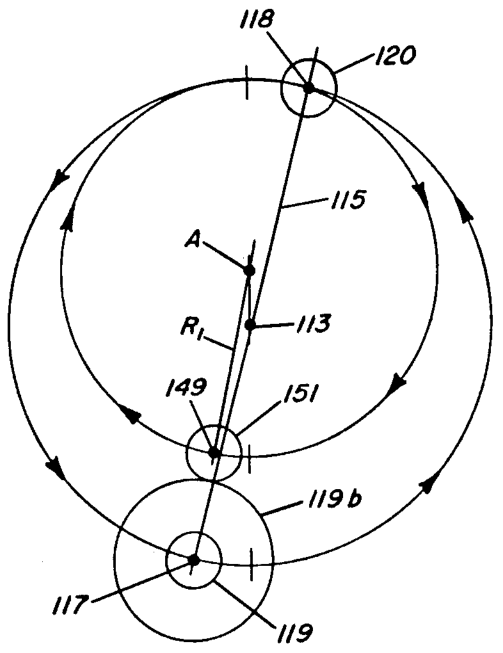

FIGURES 3A, 3B and 3C are diagrammatic illustrations, comparable respectively to FIGURES 2A, 2B and 2D, of a modified form of the invention during certain phases of the roll-forming procedure.

In the apparatus as shown by FIGURE 1, the numeral 10 designates the base of a typical and conventional turret roll winding mechanism. On this base, and in opposed relation at the respective ends of the base, are upright standards 11 and 12. These standards support a winder shaft 13 between them and a shaft drive means, such as the motor 14, outboard of the standard 12. Also supported on the standards 11 and 12, through the shaft 13, is a winder frame, including winders arms 15 and 16, and core shafts 17 and 18. The arms and shafts are arranged in respectively opposed and paired relationship, substantially in the manner shown. The drive means 14 not only provides for indexing rotation of the paired arms about the shaft 13 but also for alternate rotation of the core shafts 17 and 18 during such time as one or the other is in position to permit winding of the sheet material on a core carried by the shaft so positioned.

In the FIGURE 1, the operating elements of the turret winder are not shown in detail because of its well known and generally conventional construction, including the means whereby the shafts 17 and 18 are mounted so as to permit them to receive and provide for rotation of roll core elements such as designated by the numerals 19 and 20. It is to be noted, however, that such means include chuck elements such as generally designated by the numerals 21, 22 and 23, which are adapted to position and secure core units 19 and 20 on the shafts 17 and 18.

The numeral 24 designates a web of a sheeted material such as a fibrous material, or another, such as formed from polyethylene, cellulose acetate, polypropylene, or like synthetic materials. In particular, the present invention contemplates materials such as polyethylene and polypropylene, thermoplastic sheeted materials formed by extrusion or casting procedures.

In FIGURE 1, the origin of the web is not shown, but in the conventional extrusion or casting procedure, as formed, the web usually includes a thickened portion or bead, **24*a* and 24*b*, longitudinally of the respective edges. In the finished product, namely the mill roll contemplated, the beaded edges must be trimmed. Conventionally, this is done by means such as trimmer knives, indicated in FIGURE 1 by the numerals 25 and 26. Such knives are initially utilized in the method according to the present invention, but in the apparatus contemplated, they are disposed so as to permit withdrawal from an initial operating position. The trimmer knives, as shown, are mounted on a supported shaft 27, which shaft may be rotated so as to position the knives 25 and 26 in intersecting relation to the plane or travel path of the material web 24 or to withdraw the knives from such position. The knives are shown in an intersecting relationship, the direction of rotation of the shaft to withdraw the knives from their position being indicated by a directional arrow. In addition, the knife mounts are disposed for reciprocal movement longitudinally of the shaft 27, whereby to permit adjustment of the knives so as to accommodate for different web widths. In any event, the knives 25 and 26 are positioned with relation to each other to trim the web to a lateral dimension equal to that of the longitudinal dimension of the respective cores 19 and 20** with the cut web edges aligned with the end edges of the cores. In the operation contemplated, the web must be formed with a lateral dimension greater than the longitudinal dimension of the cores.

As shown in FIGURE 1, the web material, from whatever source, is delivered or led over idler rolls such as designated by the numerals 31 and 32. The first of these is mounted in a fixed position at a level above that assumed by either of the shafts 17 or 18 and the cores 19 or 20 mounted thereon, when in a roll winding position. The second idler 32 preferably is mounted for vertical adjustment relative to the core which may be in a winding position, whereby to insure contact of the web with the core or with the surface layer of the web wound thereon on a line not substantially about the axis of the core and in as close proximity to a vertical plane therethrough as may be permitted by the circular path described by the shafts 17 and 18 during their rotational movement about the shaft 13. Preferably, the idler 32 is positioned so as to induce initial contact of the web material wound thereon at an angle not substantially greater than about 45°, with reference of the plane of said web to said vertical plane through the axis of the core and shaft. This relationship of the idler 32 and the web plane to the core and shaft is of some critical signifiance in carrying out the method as later described.

Within the winder frame, and separately mounted on the shaft 13 thereof, are shown a pair of bearing blocks 41 and 42. These blocks, as shown, are mounted for free rotation on the shaft and for adjustable limited reciprocal movement longitudinally thereof. In addition, each block is adapted to support a pair of radius arms, such as indicated by the numerals 43 and 45 and 44 and 46, respectively. At their outer ends, the respective pairs of arms are joined by means such as journal blocks 47 and 48. The journal blocks, 47 and 48, in turn serve to support the opposite ends of a shaft 49, on which is mounted a rider roll 51. At opposite ends of the rider roll 51 are circular knife blades 53 and 54. Both the roll and the blades are adapted for mounting in fixed relation to each other or to the shaft 49. In any event, the roll 51 and blades 53 and 54 are intended for free rotation substantially in contact with the core members 19 or 20 or with the web material as wound thereon. Preferably the roll 51 is of rubber or a like material or is provided with a surface coating having a relatively high coefficient of friction in contact with the web material to be wound. Also, it is preferred that the journal blocks 47 and 48 be mounted on the respective pairs of radius arms for reciprocally adjustable positioning thereon, whereby the rider roll and knives may be properly disposed relative to the respective cores when in the winding position.

The rider roll 51 is of a length substantially equal to that of the core rolls 19 and 20, whereby to space the knife blades 53 and 54 by a distance substantially equal to the desired longitudinal dimension of the finished mill roll. As indicated by the numeral 53a the knife blades have a chamfered portion forming the cutting edge of each blade and are mounted with that portion exposed outwardly from the rider roll, the flat inner surface of each knife being disposed in very closely spaced relation to the outer ends of the rider roll or otherwise disposed so that the distance between these surfaces is very slightly greater than the length of the core rolls 19 and 20. The diameter of the knife blades is determined to be greater than that of the rider roll, but by not substantially more than one-half the difference between the inner and outer diameters of the core roll.

The weight of the trimmer assembly, including the radius arms 43, 45, 44 and 46; blocks 47 and 48; roll 51; and knives 53 and 54, is balanced by means such as the arms 61 and 62 and related counterweights 63 and 64, respectively. These counterweights are mounted for reciprocally adjustable movement on the respective arms whereby to balance the trimmer assembly on a radius substantially corresponding to an aligned with the arms 15 and 16, when disposed in position for winding the web material on mill roll core.

As previously noted, the journal blocks 47 and 48 are adjustably mounted on the radius arms 43 to 46 inclusive. In operation, according to the method contemplated, the journal blocks are so positioned as to extend the rider roll 51 into substantially tangential relationship to a core roll, when it is initially positioned to receive the web material for winding thereon. The intended disposition and relative positions of such core and rider rolls is shown by FIGURE 2A. The positioned core roll, in FIGURE 2A, is designated by the numeral 19, and its counterpart by the numeral 20, as in FIGURE 1.

In such initial position of the roll 19, the shaft 27 is rotated to interpose the knives 25 and 26 in the travel plane of the web 24, whereby to trim therefrom the beaded edge portions 24a and 24b. The trimmed web is then led over the idler rolls 31 and 32 and "started" on the core 19.

If the rider roll 51 has been properly located, in the manner contemplated, as soon as one or two layers of the trimmed web has been laid up on the core roll 19, the rotating core roll will be positively engaged in frictional contact with the rider roll 51. In such engagement, the rider roll will be rotated along with the mounting shaft 17, and the circular knife blades 53 and 54 mounted and secured thereon. As soon as the rider roll is thus positively engaged, the shaft 27 may be rotated to withdraw the trimmer knives 25 and 26 from their initial position.

In the operation, as contemplated, the core 19 is rotated at a rotational speed slightly higher than the rate of travel of the web 24, and thus applies a certain degree of longitudinal tension in the web as wound on the core. Also, inasmuch as the core roll 19 is of a lesser longitudinal dimension than the lateral dimension of the material web, when the trimmer knives 25 and 26 are moved away from the travel plane of the web, the longitudinal tension in the web draws the beaded edge portions 24a and 24b thereof downwardly over the core ends, thereby to create a certain degree of lateral tension in the web. This lateral tension coupled with the induced longitudinal tension smooths the web layers as applied to the rotating roll core. By suitable adjustment of the roll 32 the uncut web may be caused to pass over a considerable portion of the core and wound roll circumference prior to contact of the bead portions 24a and 24b with the trimmer knives 53 and 54, whereby to assure an adequate application of the induced lateral tension on the web and to achieve a maximum smoothing thereof.

The knives 53 and 54, being spaced at a distance apart just slightly greater than the length of the core rolls 19 and 20, will produce a cut web having an initial cut width slightly greater than these cores. This difference in the web width is adjusted to an allowance for "shrinkage" of the web as the lateral tension therein is relieved by trimming of the beaded edge portions 24a and 24b. In the wound roll this allowed-for "shrinkage" results in a roll wherein the end edges of the web will lie substantially in planes common to the respective ends of the core rolls on which the web is wound. With web materials having little or no elasticity, the knives may be set closer to the core ends, but preferably still not in substantial bearing or frictional contact therewith.

As the beaded edge portions are trimmed, they are removed from the vicinity of the turret frame by any suitable and conventional means. As shown in FIGURE 1, trim exhaust conduits 65 and 66 are provided for this purpose. These tubes are disposed with inlets in close proximity to the trimmer knives and are led away therefrom so as to avoid interference with rotation of the winder frame.

The operation is further illustrated by the diagrammatic showings of FIGURES 2A, 2B, 2C and 2D. In these drawings, the lines representative of structural parts of the apparatus shown in FIGURE 1 are designated by the same numerals. Thus, in these four drawings, the numerals 19 and 20 indicate core rolls, the numerals 51 a rider roll, and 15 a winder arm, all as illustrated by FIGURE 1. The radius arms 43 and 45 and the journal block 47 are collectively represented in FIGURES 2B and 2C by the line designated by the letter R. Also, in FIGURE 2B, the partially wound mill roll is designated by the numeral 19a, while in FIGURE 2C, the completed roll is designated by the numeral 19b.

As previously mentioned, the radius arm units, including the rider roll 51, are balanced to assume an initial operating position substantially as shown in FIGURE 2A. In this position, the rider roll axis is disposed in a plane common to the respective axes of the core rolls 19 and 20 and to the shaft 13, shown in FIGURE 1.

As shown in FIGURE 2B, the axial plane of the element 19, 13 and 20 is unchanged. In the winding operation, however, the partially wound roll 19a, having a greater diameter than the core 19, has caused the rider roll to be displaced from its original aligned position. FIGURE 2C in turn illustrates the relative positions of the elements as the winder arms are rotated with the shaft 13 to remove the completed roll 19b from the web winding position, as shown in FIGURES 2A and 2B. As shown, the rider roll tends to be carried along with the completed roll, especially if there is any degree of frictional contact between it and the knives 53 and 54, and also by virtue of oscillation of the radius arms and rider roll structure about the shaft 13 in returning to its original balanced position shown in FIGURE 2A. Rotation of the winder arm 15 through 180° carries the core 20 into a winding position and the core 19 and roll 19b into position for removal from the winder frame. The core 19 is then replaced by a new core in preparation for the next cycle. The position of the elements at this stage of the operation is represented in FIGURE 2D.

In an alternate form of the apparatus the trimmer frame composed of radius arms, rider roll, trimmer knives, and idler shaft is mounted on an axis displaced radially from the axis of support for the winder arms. FIGURES 3A, 3B and 3C diagrammatically illustrate the relationships contemplated by such construction and also the alternate operating procedure adapted thereto.

In FIGURES 3A, 3B and 3C the respective elements equivalent to those illustrated and represented in FIGURES 1 through 2A are designated by similar numerals in a 100 series. Thus, the represented core rolls are 119 and 120, the winder arm is 115, etc. In these figures, the trimmer frame elements represented are radius $R_1$, rider roll 151, and shaft 149. The displaced axis of the frame elements is designated by the letter A.

Although the method of operation when employing an apparatus such as represented by FIGURES 3A, 3B and 3C is similar to that employing the apparatus as shown in FIGURE 1 and represented in FIGURES 2A, 2B, 2C and 2D, certain operational characteristics are peculiar to the alternate form. Chiefly, whereas the winder arms 15 and 16 of the apparatus in FIGURE 1 are indexed in a clockwise direction, from the viewed position, in the alternate form, the arm 115 is indexed in a counterclockwise direction. Also, whereas in the basic form of the apparatus the rider roll 51 is initially extended into tangential but non-contact relation to a core roll, such as the core roll 19, in the apparatus represented by FIGURES 3A, 3B and 3C, the rider roll 151 is in tangential contact at the very beginning of the winding operation. By this relationship, as shown, it is possible to attain a greater degree of lateral tension in the web material, contact of the web with the roll or previously laid up layers extending through an arc considerably greater than the desired 180° minimum mentioned above.

On the other hand, in the apparatus according to FIGURE 1, the position of the rider roll 51, being once established with reference to a core of a certain diameter, need not be changed regardless of the radial dimension of the mill roll to be produced. In the apparatus as represented by FIGURES 3A, 3B and 3C, the radial dimension of the mill roll produced is fixed at that dimension which is slightly less than the difference between the radius of the indexing rotational path described by the mill roll axis and the radius of the path described by the rider roll axis plus its own radius. Thus, if larger diameter mill rolls are to be produced, the radius of the rider roll axis path must be shortened. If smaller rolls are to be produced, however, no change normally need be made. As shown especially by FIGURE 3C, it is preferred that the maximum mill roll radius permit clearance between the mill roll and rider roll at some point short of the perigeal position of the axis of the rider roll 151 with reference to the axis 113 of the winder arm 115.

At the point of tangential separation of the mill roll and rider roll, the counterbalanced rider roll is freed to return to engagement with the next core roll, such as designated by the numeral 120. Preferably, the rider roll 151 and its supporting radius arm elements will be counter-balanced by tensional spring means adapted to avoid forceful tangential contact between the rider roll and oppositely rotated core roll.

The specific means for accomplishment of the invention according to the alternate system disclosed are not illustrated and described in detail for the reason that they are considered to fall within the knowledge of those skilled in the art, when afforded the information provided by the generic disclosures related to the apparatus according to FIGURE 1 and supported by the operational characteristics described with reference to FIGURES 3A, 3B and 3C. The scope of the present invention, furthermore, is to be considered to be limited only by that of the appended claims.

The embodiments of the invention in which an exclusive privilege or property is claimed are defined as follows:

1. A method for forming a mill roll of a sheet material web, wherein said web is wound on a hollow, substantially rigid core, comprising winding said web on a core having a length slightly less than the width of said web, inducing a longitudinal and lateral tension in said web as wound upon said core whereby to draw the longitudinal edge portion of said web over the ends of said core and over wound layers of said web thereon substantially radially inward of said core and wound layers, and trimming said edge portions from each said web layer substantially at a point in the circumference of said core and of the wound roll not less than about 180° from the first point of contact with said circumference.

2. A method according to claim 1, wherein said web material is a thermoplastic material having elastic properties, and wherein said web is stretched under said laterally induced tension in said web.

3. A method according to claim 1, wherein said web material is a fibrous, relatively non-elastic material, and wherein said web is drawn taut over the surface of said core and of said web layers wound thereon under said laterally induced tension in said web.

References Cited by the Examiner

UNITED STATES PATENTS

| | | | |
|---|---|---|---|
| 837,340 | 12/1906 | Post | 242—56.3 |
| 1,026,482 | 5/1912 | White | 242—56.3 |
| 1,964,076 | 6/1934 | Petersen et al. | 242—65 |
| 2,672,196 | 3/1954 | Gross et al. | 242—56 X |

MERVIN STEIN, *Primary Examiner.*

W. S. BURDEN, *Assistant Examiner.*